US009549288B2

(12) United States Patent
Werner et al.

(10) Patent No.: US 9,549,288 B2
(45) Date of Patent: Jan. 17, 2017

(54) DETERMINATION OF DIFFERENTIAL FORWARD LINK CALIBRATION IN LTE NETWORKS FOR POSITIONING

(71) Applicant: QUALCOMM Incorporated, San Diego, CA (US)

(72) Inventors: Benjamin Werner, San Carlos, CA (US); Weihua Gao, San Jose, CA (US); Guttorm R. Opshaug, Redwood City, CA (US); Grant Alexander Marshall, Campbell, CA (US); Borislav Ristic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 14/146,682

(22) Filed: Jan. 2, 2014

(65) Prior Publication Data
US 2014/0295881 A1 Oct. 2, 2014

Related U.S. Application Data

(60) Provisional application No. 61/838,866, filed on Jun. 24, 2013, provisional application No. 61/817,813, (Continued)

(51) Int. Cl.
| | |
|---|---|
| *H04W 24/00* | (2009.01) |
| *H04M 3/16* | (2006.01) |
| *H04M 11/04* | (2006.01) |
| *H04W 4/02* | (2009.01) |
| *G01S 5/02* | (2010.01) |
| *G01S 5/10* | (2006.01) |

(52) U.S. Cl.
CPC ............. *H04W 4/023* (2013.01); *G01S 5/021* (2013.01); *G01S 5/0236* (2013.01); *G01S 5/10* (2013.01)

(58) Field of Classification Search
CPC ................................ H04W 64/00; H04W 4/02
USPC ......................................................... 455/456.1
See application file for complete search history.

(56) References Cited

U.S. PATENT DOCUMENTS

| | | |
|---|---|---|
| 7,127,257 B2 | 10/2006 | Riley et al. |
| 7,319,878 B2 | 1/2008 | Sheynblat et al. |
| (Continued) | | |

FOREIGN PATENT DOCUMENTS

WO  WO-2009142943  11/2009

OTHER PUBLICATIONS

International Search Report and Written Opinion—PCT/US2014/032427—ISA/EPO—Jul. 23, 2014.
(Continued)

*Primary Examiner* — Lester Kincaid
*Assistant Examiner* — Dung Lam
(74) *Attorney, Agent, or Firm* — Berkeley Law & Technology Group, LLP

(57) ABSTRACT

Techniques are provided which may be implemented using various methods and/or apparatuses to determine time difference of arrival of signals from two base stations as received at a mobile device, to use the time difference of arrival to determine differential forward link calibration for at least two base stations, and also to determine location using the differential forward link calibration for at least two base stations, determined using the time difference of arrival of signals from at least two base stations as received by a mobile device.

26 Claims, 8 Drawing Sheets

Related U.S. Application Data filed on Apr. 30, 2013, provisional application No. 61/807,662, filed on Apr. 2, 2013, provisional application No. 61/762,305, filed on Feb. 7, 2013.

(56) References Cited

U.S. PATENT DOCUMENTS

| | | | |
|---|---|---|---|
| 7,659,850 | B1 | 2/2010 | Hou et al. |
| 7,822,427 | B1 | 10/2010 | Hou |
| 7,868,826 | B1 | 1/2011 | Hou et al. |
| 8,009,519 | B2 | 8/2011 | Jazra et al. |
| 8,244,832 | B1 | 8/2012 | McGuire |
| 8,644,853 | B2 | 2/2014 | Moeglein et al. |
| 8,781,507 | B2 | 7/2014 | Werner et al. |
| 2003/0054832 | A1* | 3/2003 | Stein ............ H04W 64/00 455/456.1 |
| 2003/0125044 | A1 | 7/2003 | Deloach et al. |
| 2003/0125045 | A1 | 7/2003 | Riley et al. |
| 2003/0148761 | A1 | 8/2003 | Gaal |
| 2004/0002344 | A1 | 1/2004 | Moeglein et al. |
| 2005/0020309 | A1 | 1/2005 | Moeglein et al. |
| 2005/0227689 | A1 | 10/2005 | Jewett |
| 2006/0258369 | A1* | 11/2006 | Burroughs ............ G01S 5/0205 455/456.1 |
| 2006/0267841 | A1 | 11/2006 | Lee et al. |
| 2008/0098903 | A1 | 5/2008 | Hecker et al. |
| 2008/0122685 | A1* | 5/2008 | Vassilovski ............ H04W 64/00 342/357.31 |
| 2008/0132244 | A1 | 6/2008 | Anderson |
| 2008/0146247 | A1 | 6/2008 | Soliman |
| 2010/0093377 | A1 | 4/2010 | Riley et al. |
| 2010/0106745 | A1 | 4/2010 | Cho et al. |
| 2010/0178934 | A1 | 7/2010 | Moeglein et al. |
| 2010/0195566 | A1* | 8/2010 | Krishnamurthy ..... H04L 5/0007 370/328 |
| 2010/0331009 | A1 | 12/2010 | Krishnamurthy et al. |
| 2011/0103307 | A1 | 5/2011 | Kim et al. |
| 2011/0190004 | A1* | 8/2011 | Tenny ................ H04W 64/00 455/456.1 |
| 2012/0015667 | A1 | 1/2012 | Woo et al. |
| 2012/0021767 | A1 | 1/2012 | Paulson et al. |
| 2012/0052883 | A1 | 3/2012 | Austin et al. |
| 2012/0083288 | A1* | 4/2012 | Siomina ............... H04W 64/00 455/456.1 |
| 2013/0045759 | A1 | 2/2013 | Smith |
| 2014/0221005 | A1 | 8/2014 | Marshall et al. |
| 2016/0077185 | A1 | 3/2016 | Marshall et al. |

OTHER PUBLICATIONS

Li B., et al., "A Database Method to Mitigate the NLOS Error in Mobile Phone Positioning", Position, Location, and Navigation Symposium, 2006 IEEE/ ION Coronado, CA Apr. 25-27, 2006, Piscataway, NJ, USA,IEEE, XP010924857, DOI: 10.11 09/PLANS. 2006.1650601 ISBN: 978-0-7803-9454-4, pp. 173-178.

IEEE 802.11aa Standard—Part 11: Wireless LAN Medium Access Control MAC and Physical Layer Specifications, IEEE Computer Society, May 29, 2012, 162 pages.

* cited by examiner

DETERMINATION OF DIFFERENTIAL FORWARD LINK CALIBRATION IN LTE NETWORKS FOR POSITIONING

CROSS-REFERENCE TO RELATED APPLICATIONS

This application claims the benefit of U.S. Provisional Application No. 61/807,662, entitled "Determination of Differential Forward Link Calibration in LTE Networks for Positioning," filed Apr. 2, 2013, U.S. Provisional Application No. 61/817,813, entitled "Determination of Differential Forward Link Calibration in LTE Networks for Positioning," filed Apr. 30, 2013, U.S. Provisional Application No. 61/762,305, entitled "Cloud Based Calibration of Terrestrial Positioning Systems," filed Feb. 7, 2013, and U.S. Provisional Application No. 61/838,866, entitled "Determination of Differential Forward Link Calibration in LTE Networks for Positioning," filed Jun. 24, 2013, each of which are assigned to the assignee hereof and which are expressly incorporated herein by reference.

BACKGROUND

1. Field

The subject matter disclosed herein relates to electronic devices, and more particularly to methods and apparatuses for use in or with location determination of a mobile device using observed difference of time of arrival (OTDOA) techniques that employ forward link calibration (FLC) values.

2. Information

In particular cellular communication networks such as 4G or long-term evolution (LTE) networks, a receiving device may estimate its location using OTDOA techniques by measuring times of arrival of signals (e.g., positioning reference signals (PRSs)) transmitted by base stations (e.g., eNodeBs). The accuracy of estimating a location using this technique relies in part on the accuracy with which times of the transmission of the signals is known. A receiver device may measure times of arrival of a signal for use in OTDOA according to a time reference such as a time reference obtained from a global navigation satellite system (GNSS). However, if an internal processing delay for measuring times of arrival of signals is unknown, an error may be introduced. Unfortunately, it is expensive and time consuming to calibrate an internal processing delay for each mobile receiver device.

BRIEF DESCRIPTION OF DRAWINGS

Non-limiting and non-exhaustive aspects are described with reference to the following figures, wherein like reference numerals refer to like parts throughout the various figures unless otherwise specified.

SUMMARY

Figure 1:
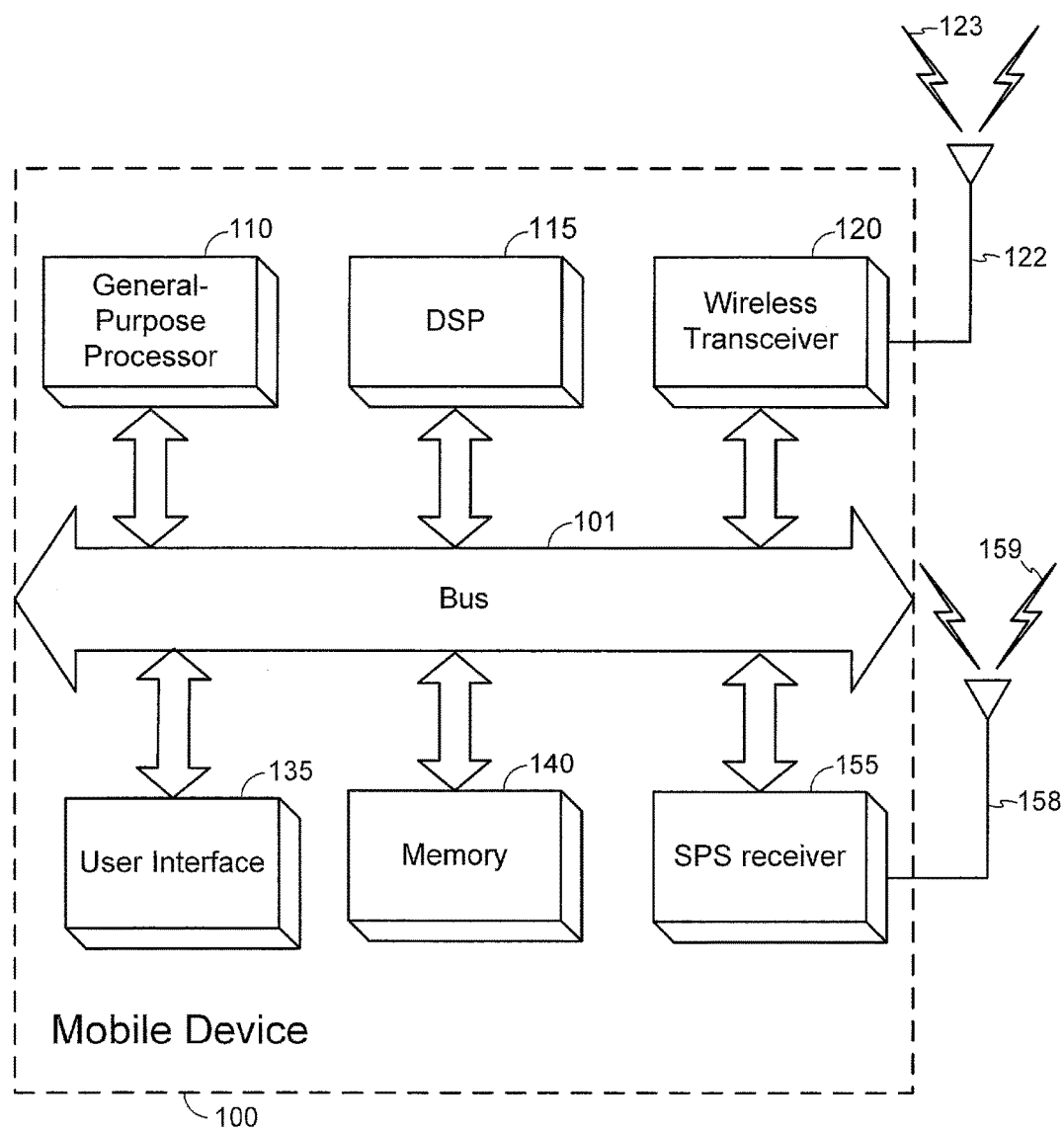
FIG. 1 is a schematic block diagram illustrating an exemplary mobile device capable of receiving positioning reference signals (PRS) and satellite positioning system (SPS) signals, and capable of calculating a location of the exemplary mobile device in accordance with an implementation.

Briefly, particular implementations are directed to a method of providing measurements from a mobile device to a location server, comprising: determining an estimated location of the mobile device; receiving a first reference signal from a first base station; receiving a second reference signal from a second base station; determining a difference between times of arrival of the first reference signal and the second reference signal; and transmitting, from the mobile device, one or more messages comprising the estimated location of the mobile device and the determined difference between times of arrival to the location server.

Another particular implementation is directed to a mobile device comprising: a transceiver to transmit messages to and receive messages from a communication network; and one or more processors to: determine an estimated location of the mobile device; measure a time of arrival of a first reference signal acquired at said transceiver from a first base station; measure a time of arrival of a second reference signal acquired at said transceiver from a second base station; determine a difference between times of arrival of the first reference signal and the second reference signal based, at least in part, on the measured times of arrival of the first and second reference signals; and initiate transmission of one or more messages through said transceiver comprising the estimated location of the mobile device and the determined difference between times of arrival to the location server.

An article comprising: a non-transitory storage medium comprising machine-readable instructions stored thereon which are executable on a mobile device to: determine an estimated location of the mobile device; determine a time of arrival of a first reference signal acquired at said transceiver from a first base station; determine a time of arrival of a second reference signal acquired at said transceiver from a second base station; determine a difference between times of arrival of the first reference signal and the second reference signal based, at least in part, on the determined times of arrival of the first and second reference signals; and initiate transmission of one or more messages through a communication network to the location server comprising the estimated location of the mobile device and the determined difference between times of arrival.

Another particular implementation is directed to a mobile device comprising: means for determining an estimated location of the mobile device; means for receiving a first reference signal from a first base station; means for receiving a second reference signal from a second base station; means for determining a difference between times of arrival of the first reference signal and the second reference signal; and means for transmitting, from the mobile device to a location server, one or more messages comprising the estimated location of the mobile device and the determined difference between times of arrival. Another particular implementation is directed to a method at a computing apparatus of determining differential forward link calibration (FLC) value for a pair of base stations, comprising: determining a difference between times of arrival at a mobile device of a first reference signal transmitted from a first base station and a second reference signal transmitted from a second base station; determining an estimated location of the mobile device; determining the differential FLC value based, at least in part, on said determined difference between times of arrival and the estimated location of the mobile device; and updating a stored differential FLC value for the first base station and the second base station based, at least in part, the determined differential FLC value.

Another particular implementation is directed to a special purpose computing apparatus for determining a differential forward link calibration (FLC) value for a pair of base stations comprising: memory device; and one or more processors to: determine a difference between times of arrival at a mobile device of a first reference signal transmitted from a first base station and a second reference signal transmitted from a second base station; determine an estimated location of the mobile device; determine the differential FLC value based, at least in part, on said determined difference between times of arrival and the estimated location of the mobile device; and update a stored differential FLC value stored in said memory device for the first base station and the second base station based, at least in part, the determined differential FLC value.

Another particular implementation is directed to an article comprising: a non-transitory storage medium comprising machine-readable instructions stored thereon which are executable by a special purpose computing apparatus to: determine a difference between times of arrival at a mobile device of a first reference signal transmitted from a first base station and a second reference signal transmitted from a second base station; determine an estimated location of the mobile device; determine the differential FLC value based, at least in part, on said determined difference between times of arrival and the estimated location of the mobile device; and update a stored differential FLC value for the first base station and the second base station based, at least in part, the determined differential FLC value.

Another particular implementation is directed to an apparatus comprising: means for determining a difference between times of arrival at a mobile device of a first positioning reference signal transmitted from a first base station and a second positioning reference signal transmitted from a second base station; means for determining an estimated location of the mobile device; means for determining the differential FLC value based, at least in part, on said determined difference between times of arrival and the estimated location of the mobile device; and means for updating a stored differential FLC value for the first base station and the second base station based, at least in part, the determined differential FLC value.

Another particular implementation is directed to a method comprising: obtaining a difference between times of arrival at a mobile device of a first reference signal transmitted from a first base station and a second reference signal transmitted from a second base station; and estimating a location of the mobile device based, at least in part, on the obtained difference, estimated locations of the first and second base stations and a differential forward link calibration (FLC) value for the first and second base stations. In one aspect, obtaining the difference between the times of arrival may further comprises: transmitting a request for the difference between times of arrival to the mobile device; and receiving one or more messages transmitted in response to said request containing the difference between times of arrival. In another particular aspect, the method may be initiated in response to receipt of a message requesting said estimated location from a requesting entity, and wherein the method further comprises transmitting one or more messages comprising said estimated location to said requesting entity. In another aspect, the requesting entity may comprise a network entity. In another aspect, the message requesting the estimated location may originate at an application server. In another aspect, the requesting entity may comprise the mobile device. In yet another aspect, the request to determine the estimated location of the mobile device may be received from a network entity. In yet another aspect, the request to determine the estimated location of the mobile device may be received from an application server. In yet another aspect, request to determine the location of the mobile device may be received from the mobile device. In yet another aspect, obtaining the difference between times of arrival may further comprise: transmitting a request for measuring times of arrival of the first and second reference signals to the mobile device; receiving a message from the mobile device in response to the request containing measured times of arrival of the first and second reference signals; and computing the difference between said times of arrival based, at least in part, on said measured times of arrival of the first and second reference signals.

Another particular implementation is directed to an apparatus comprising: one or more processors programmed with instructions to: obtain a difference between times of arrival at a mobile device of a first reference signal transmitted from a first base station and a second reference signal transmitted from a second base station; and estimate a location of the mobile device based, at least in part, on the obtained difference, estimated locations of the first and second base stations and a differential forward link calibration (FLC) value for the first and second base stations.

Another particular implementation is directed to an article comprising: a non-transitory storage medium comprising machine-readable instructions stored thereon which are executable by a special purpose computing apparatus to: obtain a difference between times of arrival at a mobile device of a first reference signal transmitted from a first base station and a second reference signal transmitted from a second base station; and estimate a location of the mobile device based, at least in part, on the obtained difference, estimated locations of the first and second base stations and a differential forward link calibration (FLC) value for the first and second base stations.

Another particular implementation is directed to an apparatus comprising: means for obtaining a difference between times of arrival at a mobile device of a first reference signal transmitted from a first base station and a second reference signal transmitted from a second base station; and means for estimating a location of the mobile device based, at least in part, on the obtained difference, estimated locations of the first and second base stations and a differential forward link calibration (FLC) value for the first and second base stations.

It should be understood that the aforementioned implementations are merely example implementations, and that claimed subject matter is not necessarily limited to any particular aspect of these example implementations.

DETAILED DESCRIPTION

Some example techniques are presented herein which may be implemented in various method and apparatuses in a mobile device and a location server to perform differential forward link calibration and to enable particular techniques for estimating locations of mobile devices.

In some networks, e.g., Long Term Evolution (LTE) networks, measurements of times of arrival of signals transmitted by base stations (e.g., eNodB) can be used for positioning provided that the times of transmission of these signals at the base stations are known. According to an embodiment, forward link calibration (FLC) values may be used to measure offsets in times of transmission of certain signals between or among different base stations in a network. In some networks, however, including many LTE networks, a highly accurate offset value (e.g., FLC value) may not be known. Also, processing delays at a handset affecting the accuracy of OTDOA measurements may not be known. In some networks, such as some LTE networks, a mobile receiver may be capable of measuring differences in times of arrival of different signals, but may be incapable of accurately determining the timing of network events in reference to a global navigation satellite system (GNSS) time domain. This may make location determination more difficult than in some other networks, such as CDMA, where FLC values may be determined based on GNSS position fixes providing a precise time transfer between a GNSS time domain and a communication network time domain at a receiver.

In some networks, such as LTE networks, it can be observed that differences between transmission may enable positioning without precise translation between time referenced in a GNSS time domain and communication network time at a receiver (e.g., on a nanosecond scale for timing network events, such as positioning reference signals (PRS) or other signals such as cell-specific reference signal (CRS) for measuring OTDOA). An observed differences in times of arrival may be utilized to obtain differences between transmission times (e.g., differential FLC value) for a pair of base stations in a network. A reliability of a differential FLC value may be increased if more measurements are available. One OTDOA measurement, along with the position of the base stations and estimated location of a mobile device obtaining the OTDOA measurement may be sufficient to compute a sufficiently accurate FLC value. However, additional measurements may yield more accurate results. A differential FLC may be utilized to increase the accuracy of OTDOA positioning.

In certain implementations, as illustrated in FIG. 1, a mobile device 100 may comprise a wireless transceiver 120 with antenna 122 for transmitting and receiving wireless signals 123 over a wireless network, a Satellite Positioning System (SPS) receiver 155 with SPS antenna 158 for receiving and processing Satellite Positioning System (SPS) signals 159. The processed SPS signals 159 may be used for estimating location of mobile device 100. Parameters or values obtained from processing received wireless signals 123 and SPS signals 159 may be stored in memory 140 or registers. The stored parameters or values may be processed through the use of one or more general-purpose processors 110, specialized processors or DSPs 115. Times of arrival of received wireless signals 123 may be measured and a difference between times of arrival of different wireless signals 123 may be determined from the stored parameters or values. The determined difference between the two times of arrival of the different wireless signals 123 along with an estimated location of the mobile device 100 may be transmitted via the wireless transceiver 120 to other devices such as a location server, such as an evolved Secure User Plane Location Center (eSMLC), or other device.

Figure 2:
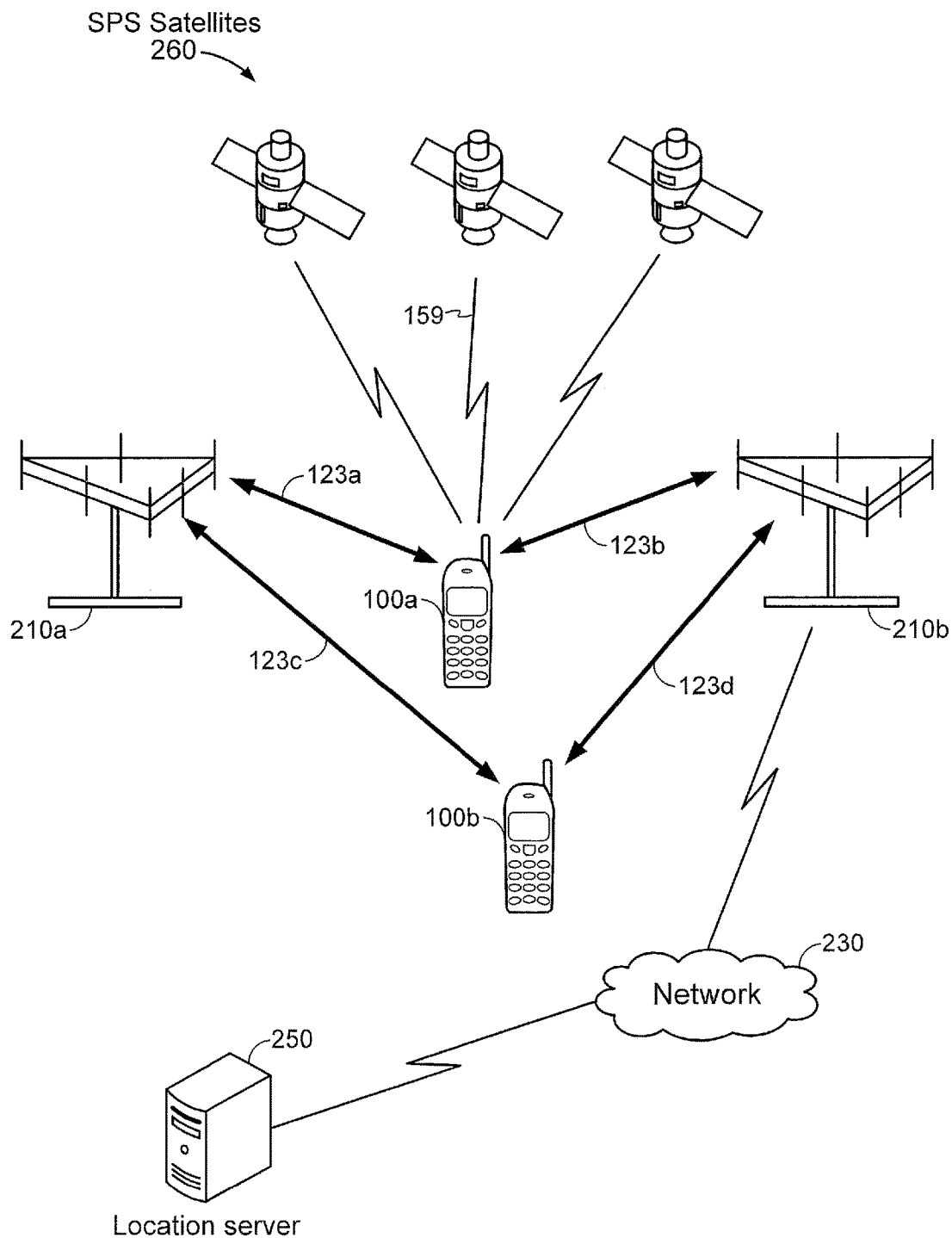
FIG. 2 is a system diagram illustrating certain features of a system containing a mobile device capable of measuring differences in times of arrival of PRS signals transmitted from base stations, calculating an estimated location and sending the estimated location and measured differences in times of arrival to a location server, in accordance with an implementation.

In certain embodiments, as illustrated in FIG. 2, a mobile device 100 may acquire SPS signals 159 from SPS Satellites 260. In some embodiments, SPS Satellites 260 may be from a single GNSS, such as the GPS or Galileo satellite systems. In other embodiments, SPS Satellites 260 may be from multiple GNSS such as, but not limited to, GPS, Galileo, Glonass, or Beidou (Compass) satellite systems. Measurements of GNSS signals or other SPS signals acquired at mobile device 100 may be utilized to estimate a location of a mobile device such as mobile device 100a, for example.

Figure 3:
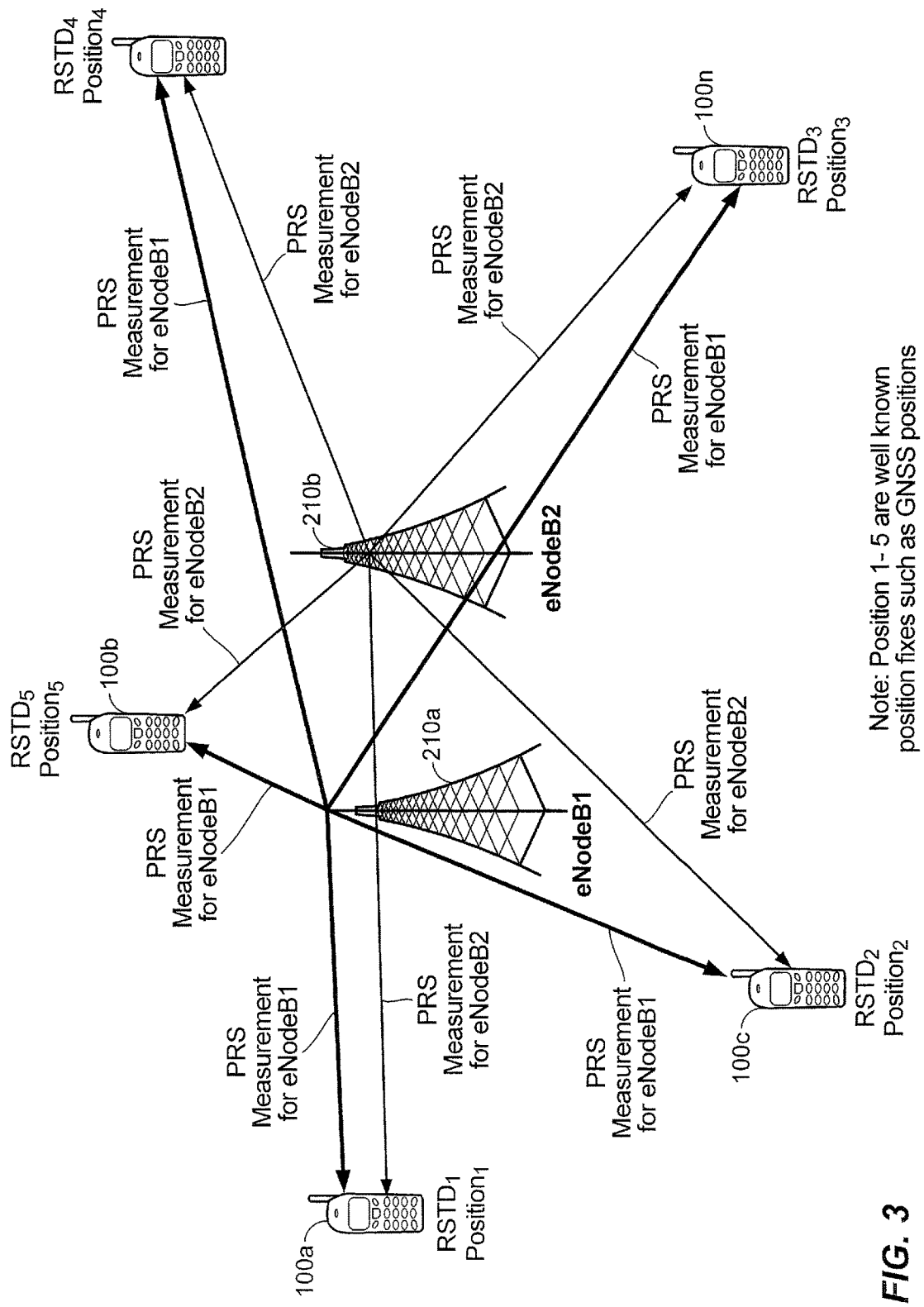
FIG. 3 is a system diagram illustrating certain features of a system containing multiple mobile devices capable of measuring the differences in times of arrival of PRS signals transmitted from base stations, calculating an estimated location and sending the estimated location and measured time difference of arrival, in accordance with an implementation.

In addition, mobile device 100a may acquire PRS signals transmitted from base station 210a and base station 210b as wireless signals 123a and 123b. In some embodiments, base station 210a and base station 210b may be part of a LTE network and may comprise EnodeB base stations, for example. In a particular implementation as shown in FIG. 3, base station 210a may be represented by EnodeB1 and base station 210b may be represented by EnodeB2. Mobile device 100a may measure a difference between times of arrival of PRS signals 123a and 123b, and then transmit the measured difference to location server 250. In this context, a time of arrival of a received PRS signal may be measured based, at least in, part, on timing of a correlation peak that results from correlating the received PRS signal with a stored replica of the PRS signal using matched filter techniques. In an example implementation, in an LTE network, location server 250 may be represented by an evolved Secure User Plane Location Center (eSMLC).

Location server 250 may determine a differential FLC value based, at least in part, on a measured difference between times of arrival of wireless signals 123a and 123b transmitted by base stations 210a and 210b, respectively. Location server 250 may combine multiple measurements of such differences in times of arrival from multiple mobile devices (e.g., mobile devices 100a and 100b) to calculate a differential FLC value for a pair of base stations. Differential FLC values computed from different pairs of differences between times of arrival of PRS signals 123a and 123b (e.g., as obtained by the same or different mobile devices), may be combined. For example, such differential FLC values may be combined to compute a mean value, a median value and/or center of the distribution of values for differential FLC for a pair of base stations such as base station 210a and base station 210b. In a particular implementations, any one of several "best fit" approaches may be implemented for calculating an estimated differential FLC value such as, for example, a least squares fit or a weighted combination where outliers are deweighted.

A computed differential FLC value may be used by location server 250 to estimate a location of mobile device 100*b*, for example. Location server 250 may use times of arrival of wireless signal 123*c* and wireless signal 123*d* (e.g., transmitted as first and second PRS signals, respectively) in conjunction with a computed differential FLC value for base station 210*a* and base station 210*b* to calculate an estimated location of mobile device 100*b*. In some embodiments, measurements of arrival times of multiple pairs of received PRS signals from respective base station pairs may be utilized to estimate a location of mobile device 100*b*. It should be understood that a base station may comprise one base station (e.g., e-NodeB) of multiple base station pairs (e.g., pairs of e-NodeB), and therefore may have multiple FLC values associated therewith (e.g., at least one FLC value for each base station pair used to determine the location of a mobile device).

In certain implementations, as illustrated in FIG. 3, multiple mobile devices, for example, 100*a* through 100*n*, may be utilized to measure arrivals of PRS signals transmitted from base stations 210*a* and 210*b* to calculate a difference in times of arrival for signals transmitted from base stations 210*a* and 210*b*. A mobile device from among mobile devices 100*a* through 100*n* may be capable of calculating an estimate of its location, for example, via acquisition of GNSS signals, signals transmitted from land based tranceivers or via other means known in the art. A mobile device from among mobile devices 100*a* through 100*n* may also be capable of forwarding an estimate of its location and measured differences in times of arrival acquired PRS signals transmitted by a pair of base stations to location servers such as location server 250, for example.

Figure 4:
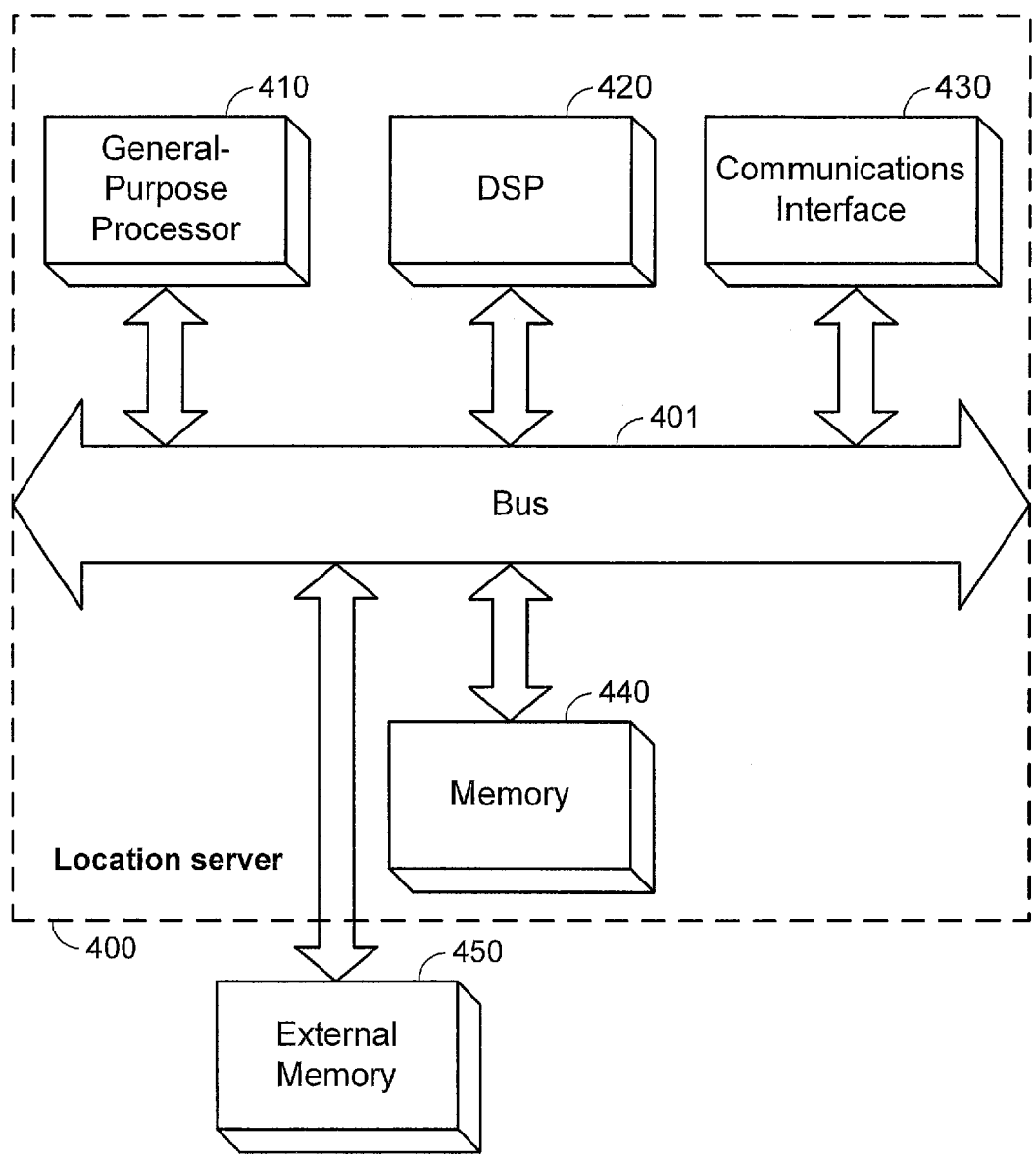
FIG. 4 is a schematic block diagram illustrating an exemplary location server capable of receiving mobile device location estimates and differences in times of arrival values from positioning reference signals (PRS), determining differential forward link calibration (FLC) values and calculating an estimated location of mobile devices using differential FLC values in accordance with an implementation.

In certain implementations, location server 250 may comprise some or all of the devices of location server 400 as illustrated in FIG. 4. Location server 400 may include a communications interface 430, such as a network interface, which is capable of transmitting and receiving messages over a network 230, one or more general-purpose processors 410 and/or specialized processors or DSPs 420, memory 440 such as RAM, ROM, FLASH or other operating memory as well as device based memory such as internal disc drives and external memory 450 such as hard disc drives, optical drives or other external memory devices. The communications interface 430 may be capable of receiving from mobile device 100 differences in times of arrival of PRS signals and estimated locations of the mobile device 100. Differences in times of arrival and estimated locations of the mobile device 100 may be used to calculate and/or update a differential FLC value associated for a base station pair, such as base station 210*a* and base station 210*b*. Communications interface 430 may also be capable of receiving messages comprising measured times of arrival of acquired PRS signals from mobile station 100*b* which may be used, in some embodiments, to calculate an estimate of the location of mobile station 100*b*. Processor 410 and/or DSP 420 may be used to calculate the estimate of the location of mobile station 100*b* based, at least in part, on measured times of arrival of signals acquired from base station 210*a* and base station 210*b* (or a difference in times of arrival of PRS signals 123*c* and 123*d* from base stations 210*a* and base stations 210*b*), estimated locations of base stations 210*a* and 210*b*, and the differential FLC value for base stations 210*a* and 210*b* (e.g., from execution of machine-readable instructions stored on memory 440). Computed differential FLC values and/or measured differences in times of arrival may be combined with parameters derived from other base station pairs, measurements of ranges to other terrestrial transceivers and pseudorange measurements from GNSS satellites. In an embodiment for an LTE network, Location server 400 may comprise an evolved Secure User Plane Location Center (eSMLC).

Figure 5:
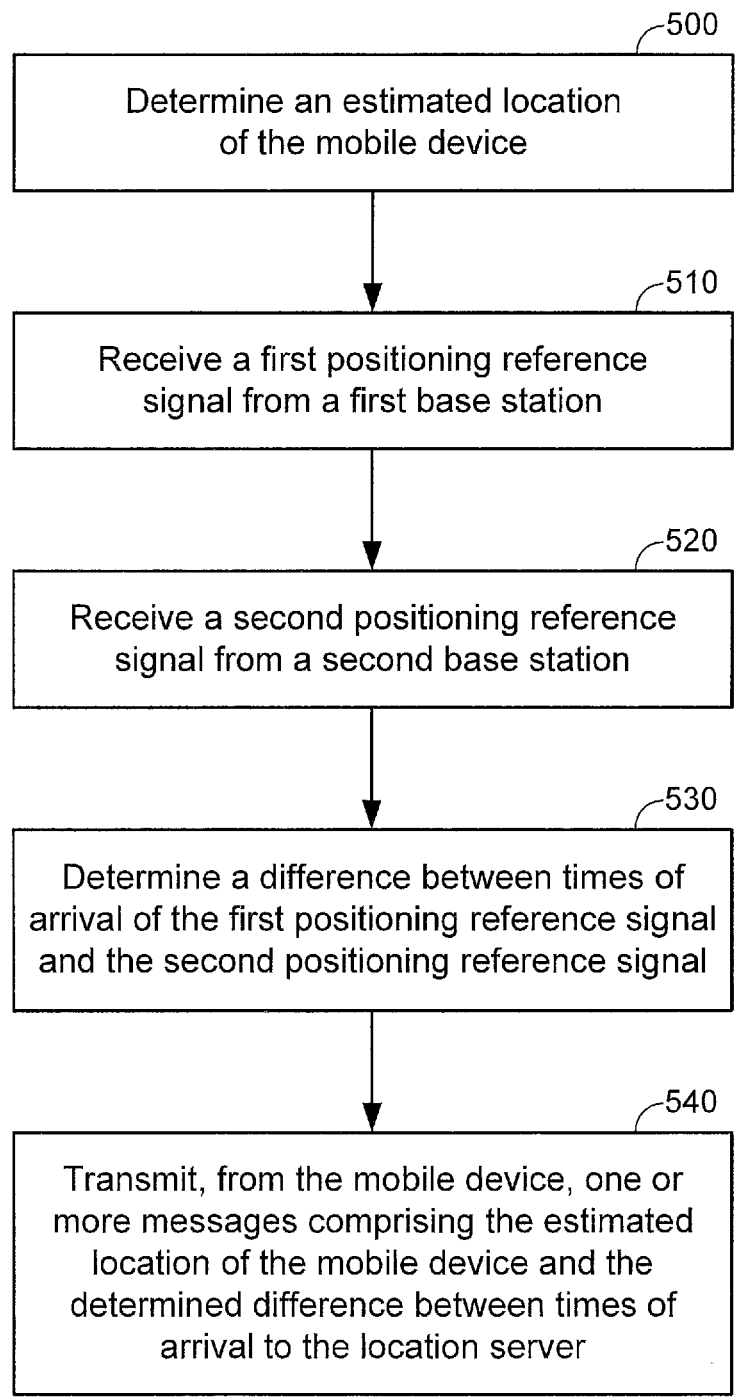
FIG. 5 is a flow diagram illustrating certain features of an exemplary process for estimating a location of a mobile device based on a measured difference between times of arrival of signals according to an embodiment.

FIG. 5 is a flow diagram illustrating a process of determining a difference in times of arrival of acquired PRS signals (e.g., wireless signals 123*a* and 123*b*) transmitted from a pair of base stations (e.g., base station 210*a* and base station 210*b*). In some embodiments, the process of FIG. 5 may be performed at a mobile device and initiated in response to a user input. For example, the process of FIG. 5 may be implemented in mobile device 100 used as a network calibration device. In an alternative embodiment, an estimated differential FLC may be calculated on a mobile device, and then forwarded to a server for use in in updating an existing estimated differential FLC value to be used as positioning assistance data.

In some embodiments, the process of FIG. 5 may be initiated as part of an ongoing location determination session with a location server, particularly if GNSS measurements are available and sufficient to calculate an accurate estimate of a location of a mobile device, but where measured differences in times of arrival of PRS signals are also taken by a mobile device and reported to a location server (e.g., location server 250). In some embodiments, the process of FIG. 5 may be initiated in response to a request by a location server, for example, by an eSMLC in an LTE network, as part of a mobile assisted location request where location is to be calculated by the server. In some embodiments, a variety of methods may be used to initiate the process of FIG. 5 to report measured differences in times of arrival for PRS signals, possibly including one or more of the above initiation methods. In some embodiments, for example on LTE networks, a measured difference in times of arrival for PRS signals may be referred to as a Reference Signal Time Difference (RSTD). In some embodiments, for example on LTE networks, a difference in times of arrival for PRS signals may be measured during a predetermined period of time during which a time offset of PRS from different cells is estimated. In some embodiments, the PRS time offset for multiple pairs of base stations may be determined and sent to a location server.

In some embodiments, prior to or in conjunction with execution of the process of FIG. 5, a mobile device may receive positioning assistance data. For example, such positioning assistance data may include SPS assistance data or a list of base stations (e.g., such as base stations 210*a* and 210*b*) estimated locations of the base stations, description of PRS parameters for those base stations such as frequency, bandwidth, timing or periodicity. These parameters characterizing base stations in a network may be included in a table that is a subset of a base station almanac or provided separately. In some embodiments, a base station almanac with positioning assistance data for the listed base stations may be pre-loaded onto mobile device 100 or periodically downloaded from a location server 250 or from an Alamanac server. In some embodiments, common reference signals (CRS) signals may also be utilized and may be represented by signals 123*a*, 123*b*, 123*c* and 123*d*.

At block 500, an estimated location of a mobile device may be determined using any one of several techniques known in the art. For example, a location of the mobile device may be estimated based, at least in part, on acquisition of satellite-based signals such as GNSS signals such as GPS, Beidou, Galileo or GLONASS signals. For example, SPS signals may be received at antenna 158 and processed at SPS receiver 155 and DSP 115 and/or general-purpose processor 110 (FIG. 1) for estimating a location of the mobile device. Alternatively, a location of the mobile device may be estimated based, at least in part, on acquisition of terrestrial reference signals such as wireless signals transmitted from wireless base stations, or wireless access points, or other terrestrial transceivers. For example, wireless signals may be received at antenna 122 and processed at wireless transceiver 120 and DSP 115 and/or general-purpose processor 110 for estimating a location of the mobile device (FIG. 10). A location of the mobile device may also be estimated using a combination of acquired signals and measured ranges to various terrestrial and/or satellite-based sources.

At block 510 a first PRS signal (e.g., as wireless signals 123*a*) is acquired from a first base station (e.g., base station 210*a*). In one alternative implementation, a timer may be started at the receipt of the first PRS signal. At block 520 a second PRS signal (e.g., as wireless signal 123*b*) is acquired from a second base station (e.g., base station 210*b*). The time of receipt or relative time of receipt may be recorded. Alternatively, if a timer was started in response to receipt of the first PRS signal (as discussed above in block 510) the timer may be stopped in response to acquisition of the second PRS signal. The value of the stopped timer may then indicate differences in the times of receipt of the first and second PRS signals. In a particular example implementation, the first and second PRS signals may be received at antenna 122 and processed by wireless transceiver 120, and DSP 115 and general-purpose processor 110 for detecting/measuring relative times of arrival of the first and second PRS signals (FIG. 1).

At block 530, a difference between a time of arrival of the first PRS reference signal and a time of arrival of the second PRS signal is measured. In some embodiments, such a difference in times of arrival may be measured by subtracting a time of arrival of the second PRS signal from a time of arrival of the first PRS signal. The times may be relative or absolute. In some embodiments, the difference in time of arrival may be determined by the value of an elapsed timer that is started in response to receipt of the first PRS signal and stopped in response to receipt of the second PRS signal. Here, the difference obtained at block 530 may be determined by operations performed at general-purpose processor 110 and/or DSP 115 based on acquisition of the first and second PRS signals at wireless transceiver 120 (FIG. 1).

At block 540, an estimated location of the mobile device and measured difference between a time of arrival for the first PRS signal and time of arrival for a second PRS signal may be may be transmitted in messages to a location server (e.g., location sever 250 via network 230). In an alternative implementation, a computed differential FLC estimate may be transmitted to the location server to be combined with other differential FLC estimates. A distribution (e.g., histogram) of the combined estimates may be formed, and a center estimate of the distribution may be selected, for example. These messages may also include identifiers of the base stations that transmitted the first and second PRS signals (base stations 210*a* and 210*b*) and, in some embodiments, one or more identifiers of the mobile device. The estimated location of the mobile device and measured difference may be transmitted through wireless transceiver 120 and antenna 122 (FIG. 1).

Figure 6:
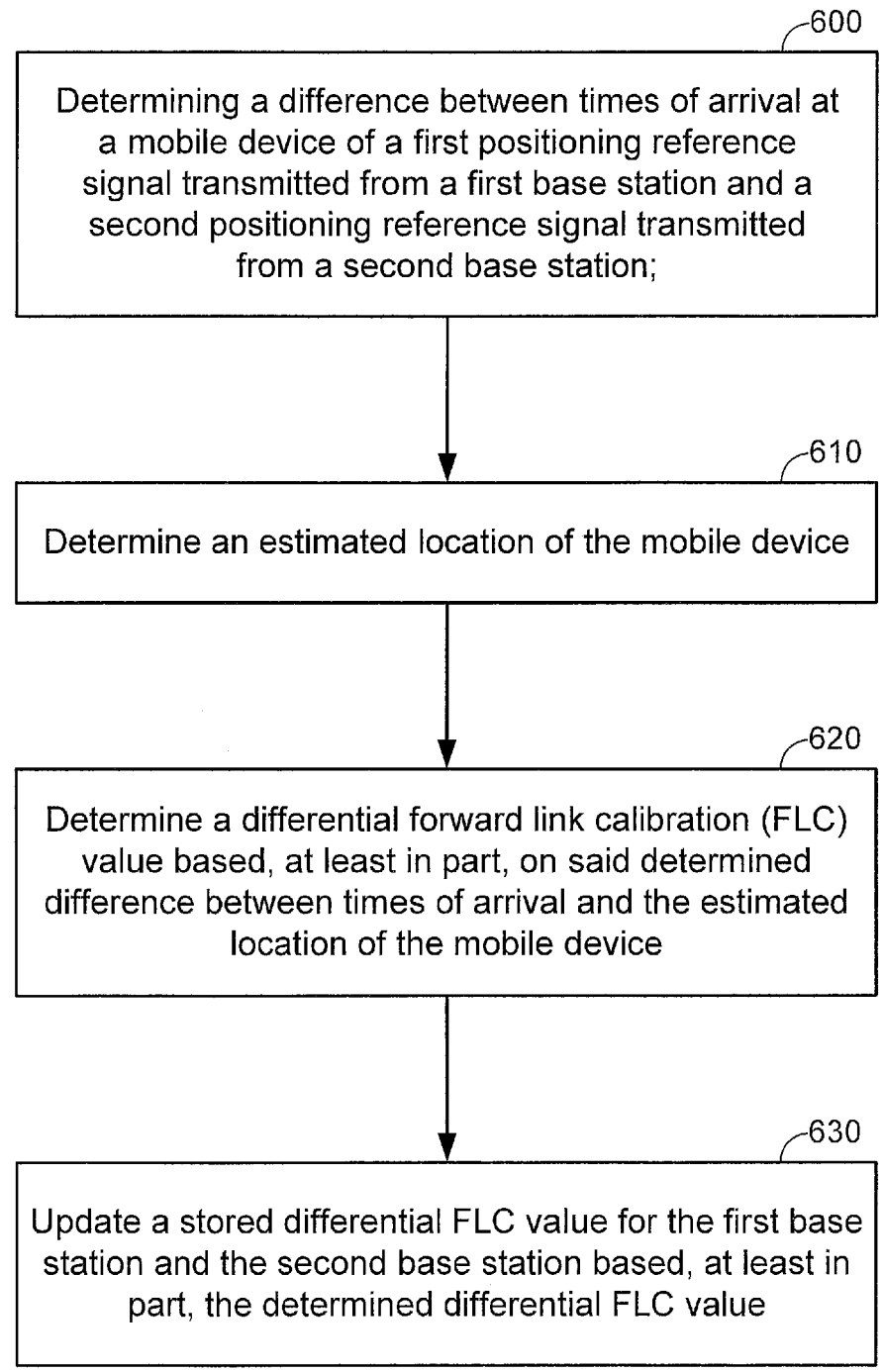
FIG. 6 is a flow diagram illustrating certain features of an exemplary process for to determine a differential FLC value and to utilize the differential FLC value to enable particular techniques for estimating a location of mobile devices, in accordance with an implementation.

In FIG. 6, a differential FLC value for a pair of base stations may be computed. In one example, implementation, the process of FIG. 6 may be performed by location server 250. For example, location server 250 may receive and use messages from handset 100*a* to determine a differential FLC value for base stations 210*a* and 210*b*. In an alternative implementation, a differential FLC value may be computed at a mobile device and transmitted to location sever 250. In some embodiments, the process of FIG. 6 may be initiated by location server 250 sending a request to mobile device 100*a* for an estimated location of mobile device 100*a*, and for a measured difference in times of arrival for at least one pair of base stations 210*a* and 210*b*. In some embodiments, the process of FIG. 6 may be initiated by location server 250 in response to receiving a request to calculate an estimated location of mobile device 100*a*, for example, as part of an emergency location request or as part of a mobile-assisted location request where location server 250 also calculates an estimated location of mobile device 100*a*. In cases where a mobile device reports GNSS measurements that are sufficient for obtaining an accurate location estimate, but also reports differences in times of arrival for PRS signals transmitted by at least one pair of base stations (e.g., base stations 210*a* and 210*b*), the measured differences of times of arrival may be utilized to determine, update or modify stored differential FLC values, for example, such as differential FLC values stored in a base station almanac. If differential FLC values are stored in a base station almanac, an entry for a given base station may include fields for a plurality of base station pairs linked to respective differential FLC values for the base station pairs.

Block 600 may determine a difference between times of arrival of a first PRS signal transmitted by a first base station (e.g., base station 210*a*) and a second PRS signal transmitted by a second base station (e.g., base station 210*b*) at a mobile device. In one example, location server may receive one or more messages from mobile device 100*a* containing a difference between times of arrival at mobile device 100*a* of a first PRS signal (e.g., wireless signal 123*a*) transmitted by a first base station (e.g., base station 210*a*) and of a second PRS signal (e.g., wireless signal 123*b*) transmitted by a second base station (e.g., base station 210*b*). In a particular implementation, the one or more messages may be received at communication interface 430 (FIG. 4). In other embodiments, the times of arrival of first and second PRS signals (relative or absolute) as observed at mobile device 100*a* may be transmitted to location server 250 (e.g., instead of the measured difference in times of arrival value for base stations 210*a* and 210*b*) which may be used to calculate a differential FLC value for the first base station, base station 210*a*, and for the second base station, base station 210*b* at block 620.

Block 610 may determine an estimated location of mobile device 100*a* using any one of several techniques. In one example implementation, the estimated location of mobile device 100*a* may be provided with the one or more messages including differences in times of arrival of PRS signals. In another alternative implementation, the estimated location of the mobile device 100*a* may be computed (e.g., by general-purpose processor 410 and/or DSP 420 through execution of machine-readable instructions stored on memory 440) based on measurements or observations. For example, location server 250 may obtain ranging and/or timing measurements from the mobile device (e.g., in messages received from the mobile device or otherwise). In some embodiments, the process of FIG. 6 may be initiated in response to a request from mobile device 100*a* for position assistance data. For example, the process of FIG. 6 may be initiated in response to a request made to location server 250 to estimate a location of mobile device 100a. In other embodiments, the process of FIG. 6 may be initiated by mobile device 100a, for example, in the course of performing network calibration where mobile device 100a is a network calibration device. In other embodiments, the process of FIG. 6 may be initiated by location server 250 requesting measurements and/or an estimated location from mobile device 100a. In other embodiments, the process of FIG. 6 may be initiated in response to transmission of positioning assistance data to mobile device 100a.

At block 620, location server 250 may determine a differential FLC value for the first base station and for the second base station using a measurement of differences in times of arrival determined at block 600. In an alternative embodiment, location server 250 may determine a differential FLC value for the first base station and for the second base station using measured times of arrival of acquired first and second PRS signals, as transmitted by the mobile device. In an alternative embodiment, location server 250 may determine a differential FLC value for the first and second base stations using raw timing and signal measurements of acquired first and second PRS signals, as sent by the mobile device.

Figure 8:
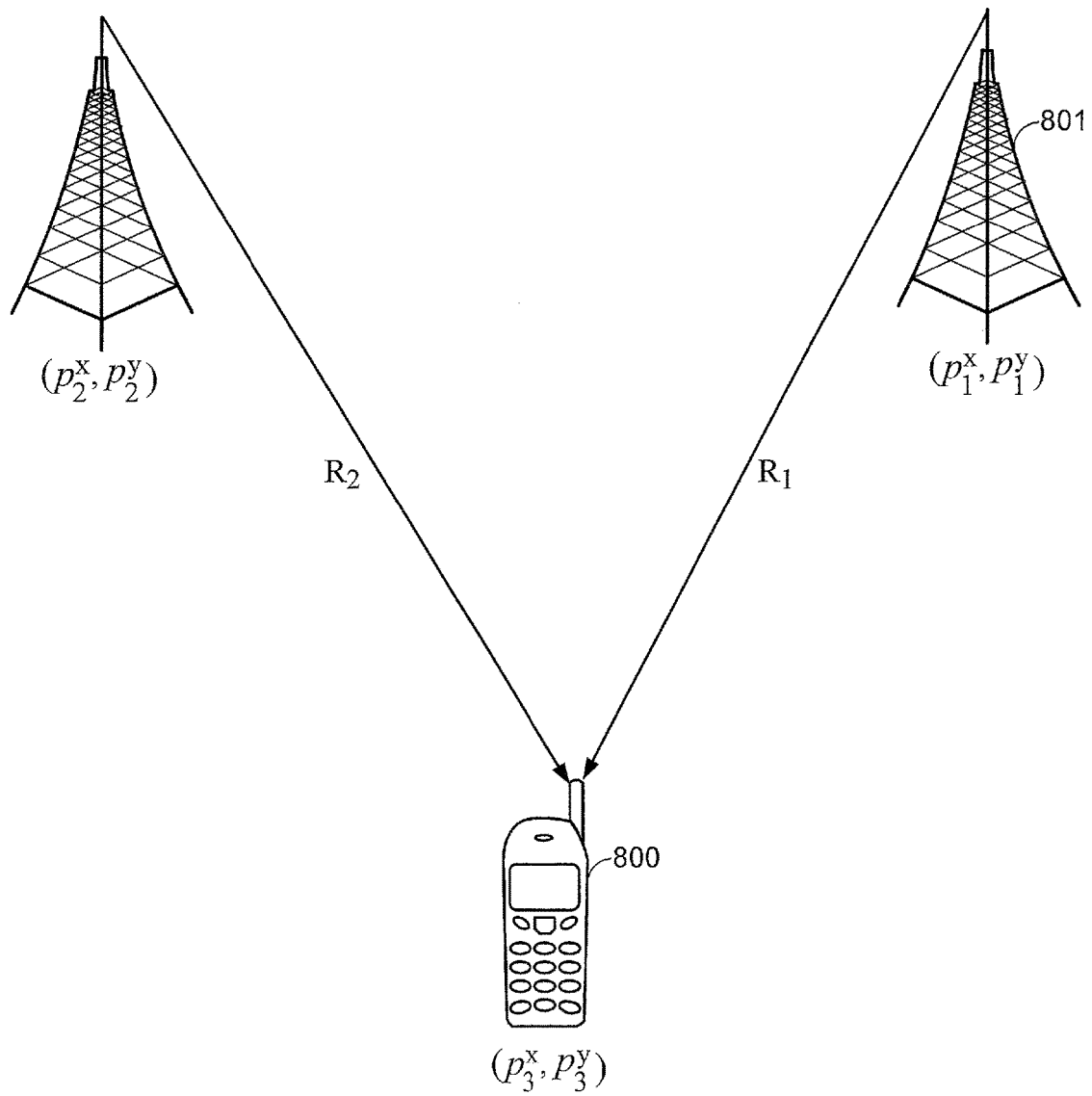
FIG. 8 shows placement of a mobile device relative to a pair of base stations in a wireless communication network according to an embodiment.

FIG. 8 illustrates placement of a mobile device 800 relative to base stations 801 and 802 forming a pair of base stations in a communication network according to an embodiment. For simplicity, FIG. 8 merely shows one pair of base stations that are in range of mobile device 800. It should be understood, however, that multiple different pairs of base stations in a network may be in range of mobile device 800. It should be further understood that there may be other mobile devices within range of base stations 801 and 802. As discussed above in connection with a particular embodiment, FLC values may be determined for different pairs of base stations in a communication network. According to an embodiment, location server 250 at block 620 may compute an FLC value for a pair of base stations (base stations "1" and "2") as shown in FIG. 8 according to relation (1) as follows:

$$FLC_{2 \leftarrow 1} = PRS_2^T - PRS_1^T = PRS_2^R - PRS_1^R - (R_2 - R_1)/c \quad (1)$$

where:

$$R_1 = \sqrt{(p_1^x - p_3^x)^2 + (p_1^y - p_3^y)^2};$$

$$R_2 = \sqrt{(p_2^x - p_3^x)^2 + (p_2^y - p_3^y)^2};$$

$PRS_1^T$ is a time of transmission of a PRS signal from a first base station (e.g., base station 801);

$PRS_2^T$ is a time of transmission of a PRS signal from a second base station (e.g., base station 802);

$PRS_1^R$ is a time of receipt at a mobile device (e.g., mobile device 800) of the PRS signal transmitted at time $PRS_1^T$;

$PRS_2^R$ is a time of receipt at a mobile device (e.g., mobile device 800) of the PRS signal transmitted at time $PRS_2^T$;

c is the speed of light;

$p_1^x$ is an x coordinate of a location of a first base station (e.g., base station 801);

$p_1^y$ is a y coordinate of a location of a first base station (e.g., base station 801);

$p_2^x$ is an x coordinate of a location of a second base station (e.g., base station 802);

$p_2^y$ is a y coordinate of a location of a second base station (e.g., base station 802);

$p_3^x$ is an x coordinate of a location of a mobile device (e.g., mobile device 800); and $p_3^y$ is a y coordinate of a location of a mobile device (e.g., mobile device 800).

At block 630, location server 250 may update a stored differential FLC value for a first base station and a second base station using the received time different of arrival. In a particular implementation, general-purpose processor 410 may update a differential FLC value for the first and second base stations in memory 440 or external memory 450. The updating may be performed using any one of several techniques such as by combining a history of measured differential FLC values by averaging, determining a median differential FLC value using the computed and historical differential FLC values, or doing a least squares fit on the measured and historical differential FLC values, just to provide a few examples.

Figure 7:
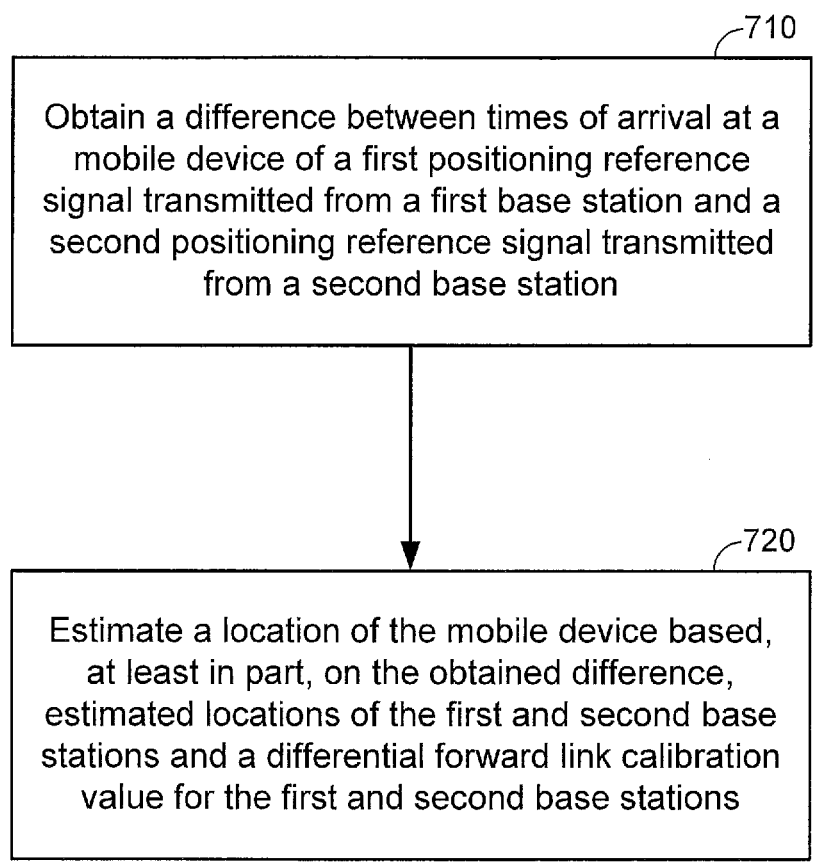
FIG. 7 is a flow diagram of a process for computing an estimated location of a mobile device according to an embodiment.

FIG. 7 illustrates an exemplary process to estimate a location of mobile device 100b. In one implementation, the process of FIG. 7 may be performed by location server 250. In an alternative embodiment, the process of FIG. 7 may be performed by mobile device 100b. In one particular implementation, the process of FIG. 7 may be performed by location server 250 in response to receipt of a request to estimate the location of mobile device 100b. In some embodiments, a request for an estimated location of mobile device 100b may be initiated by mobile device 100b, and a request to estimate a location of mobile device 100b may be transmitted by mobile device 100b. In some embodiments, a request for an estimated location of mobile device 100b may be initiated by a network entity such as, for example, a public safety answering point, an application server, or from the call processing infrastructure such as the base station, mobile switching center or other network infrastructure devices.

In some embodiments, location server 250 may respond to a request to estimate a location of mobile device 100b by transmitting positioning assistance data to mobile device 100b. The positioning assistance data may be utilized by mobile device 100b to measure differences in times of arrival of signals transmitted by base station pairs, such as base stations 210a and 210b.

As discussed above, in some embodiments, positioning assistance data may include a list of base stations, such as base station 210a and base station 210b, description of PRS parameters for those base stations such as frequency, bandwidth, timing or periodicity. This description of PRS parameters may be included in a table that is a subset of a base station almanac or provided separately. In some embodiments, a base station almanac with positioning assistance data for the listed base stations may be pre-loaded onto a mobile device (e.g., mobile device 100) or periodically downloaded from a location server 250 or from an almanac server. In some embodiments, base station almanac information may include differential FLC values for respective base station pairs, linked to the entries for the respective base stations that enable the mobile device to calculate estimates of its location directly using a mobile based method of location determination.

At block 720, location server 250 may estimate a location of the mobile device based, at least in part, on the difference between times of arrival obtained at block 710, estimated locations of the first and second base stations and differential FLC values for the first and second base stations. Blocks 710 and 720 may be performed, at least in part, by general-purpose processor 410 and/or DSP 420 in combination with executable instructions stored on memory 440. In an alternative mobile based location determination implementation, blocks 710 and 720 may be bypassed by location server 250 and an estimated location of the mobile device may be determined on the mobile device using the time difference of arrival measurements for at least one pair of base stations and using differential FLC value(s) for at least one pair of base stations. Here, for example, blocks 710 and 720 may be performed, at least in part, by general-purpose processor 110 and/or DSP 115 in combination with instructions stored on memory 140.

For mobile assisted location determination, an estimated location may be calculated on location server 250. In one embodiment, at block 710, location server 250 may receive a measured difference between times of a first PRS signal, such as wireless signal 123a, from a first base (e.g., base station 210a), and a second PRS signal, such as wireless signal 123b, from a second base station (e.g., base station 210b). In some embodiments, multiple time difference of arrival measurements may be received for corresponding pairs of base stations, such as base stations 210a and 210b, and may be utilized to calculate the estimated location in block 720 below.

In block 710, in an embodiment, the value for the difference in time of arrival value for the first base station and for the second base station may be calculated by mobile device 100a and transmitted in a message sent to location server 250. However, in other embodiments, the (relative or absolute) differences in time of arrival of the first and second PRS signals or, in another embodiment, raw signal and timing measurements from acquisition of the first and second PRS signals may be transmitted from mobile device 100a in a message to the location server 250 (instead of the differences in time of arrival value for the first and second base stations) which may be used to calculate a differential FLC value for the first and second bases; in some embodiments where the raw signal and timing measurements are sent to location server 250, it may be unnecessary to send positioning assistance data to mobile device 100b and the raw measurement data and timing measurements may be utilized to calculate location or differential FLC values directly.

At block 720, location server 250 may estimate a location of mobile device 100b using parameters comprising a measured difference in time of arrival for a first PRS signal (e.g., wireless signal 123c) transmitted from a first base station (e.g., base station 210a) and arrival of a second PRS signal (e.g., wireless signal 123d) transmitted from a second base station (e.g., base station 210b), estimated locations of the first and second base stations, and the differential FLC value for the base station pair comprising the first and second base stations. A location of the mobile device may be estimated using any one of several techniques such as, for example, OTDOA. Assume, for example, OTDOA is performed for PRS signals transmitted by three different base stations where one of the PRS signals is selected as a reference PRS. Differential FLC values relating the reference PRS to the two other PRS' may be used to correct the relative timing offset between the reference PRS and the two other PRS'. In an embodiment, multiple sets of the above information corresponding to multiple pairs of base stations may be utilized to determine the location of mobile device 100b.

In some embodiments, location server 250 may determine an estimated location of mobile device 100b based, at least in part, on parameters comprising a measured difference between a time of arrival of a first PRS signal (e.g., wireless signal 123c) transmitted from a first base station (e.g., base station 210a) and time of arrival of a second PRS signal (e.g., wireless signal 123d) transmitted from a second base station (e.g., base station 210b), estimated locations of the first and second base stations, and a differential FLC value for the first and second base stations. In alternative embodiments, additional measurements may be used in calculating the estimated location of mobile device 100b such as measurements of ranges to other terrestrial transmitters and/or psuedoranges to GNSS satellites.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying" and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

The methodologies described herein may be implemented by various means. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of using signal times of arrival measurements from a plurality of mobile devices, the method comprising at a location server:
receiving from each mobile device of the plurality of mobile devices an estimated location of the mobile device, wherein the estimated location is based, at least in part, upon Satellite Positioning System (SPS) signals received by the mobile device from SPS satellites;
receiving from said each mobile device of the plurality of mobile devices a determined difference between times of arrival of a first reference signal from a first base station and a second reference signal from a second base station, wherein the determined difference between times of arrival is as determined by said each mobile device, and wherein the first and second base stations are part of a Long Term Evolution (LTE) network;
determining a plurality of transmission time offsets by determining, for each of said mobile device of the plurality of mobile devices, a transmission time offset of signals from the first and second base stations based, at least in part, upon a first distance and upon a second distance and upon the determined difference between times of arrival, wherein the first distance is a distance between an estimated location of the first base station and the estimated location of said each mobile device of the plurality of mobile devices, and wherein the second distance is a distance between an estimated location of the second base station and the estimated location of said each mobile device of the plurality of mobile devices;

combining the plurality of transmission time offsets to determine an adjusted transmission time offset; and determining an estimated location of a second mobile device based, at least in part, upon a second determined difference between times of arrival at the second mobile device of a third reference signal from the first base station and a fourth reference signal from the second base station and upon the adjusted transmission time offset, wherein the second mobile device is not any one of the plurality of mobile devices.

2. The method of claim 1, wherein the receiving of the estimated location of the mobile device and the receiving of the determined difference between times of arrival are initiated in response to receipt by said each mobile device of a message from the location server requesting the estimated location of said each mobile device and for the determined difference between times of arrival.

3. The method of claim 1, wherein the receiving of the estimated location of the mobile device and the receiving of the determined difference between times of arrival are initiated in response to receipt of a user input selection at said each mobile device.

4. The method of claim 1, further comprising:
receiving from said each mobile device of the plurality of mobile devices a request for positioning assistance data;
transmitting to said each mobile device of the plurality of mobile devices the positioning assistance data,
wherein the estimated location of said each mobile device of the plurality of mobile devices is based, at least in part, on the received positioning assistance data.

5. The method of claim 1, further comprising:
transmitting to said each mobile device of the plurality of mobile devices a request for measurements by said each mobile device; and
transmitting to said each mobile device of the plurality of mobile devices positioning assistance data descriptive of aspects of at least the first and the second base stations.

6. The method of claim 5, wherein said positioning assistance data comprises the estimated location of the first base station and the estimated location of the second base station.

7. The method of claim 1, wherein the first reference signal comprises one of a first positioning reference signal or a first carrier reference signal, and wherein the second reference signal comprises one of a second positioning reference signal or a second carrier reference signal.

8. The method of claim 1 wherein the combining of the plurality of transmission time offsets comprises one or more of computing a mean value of the plurality of transmission time offsets, computing a median value of the plurality of transmission time offsets, computing a center of distribution of the plurality of transmission time offsets, computing a least squares fit of the plurality of transmission time offsets, or computing a weighted combination of the plurality of transmission time offsets where outliers are deweighted.

9. A location server configured for communicating with a plurality of mobile devices via a communication network, the location server comprising:
a network interface to transmit messages to and receive messages from the communication network; and
one or more processors configured to:
obtain from each mobile device of the plurality of mobile devices an estimated location of the mobile device, wherein the estimated location is based, at least in part, upon Satellite Positioning System (SPS) signals received by the mobile device from SPS satellites;
obtain from said each mobile device of the plurality of mobile devices a determined difference between times of arrival of a first reference signal from a first base station and a second reference signal from a second base station based, at least in part, on a measured time of arrival of the first reference signal and a measured time of arrival of the second reference signal, wherein the first and second base stations are part of a Long Term Evolution (LTE) network;
determine a plurality of transmission time offsets by determining, for each of said mobile device of the plurality of mobile devices, a transmission time offset of signals from the first and second base stations based, at least in part, upon a first distance and upon a second distance and upon the determined difference between times of arrival,
wherein the first distance is a distance between an estimated location of the first base station and the estimated location of said each mobile device of the plurality of mobile devices, and
wherein the second distance is a distance between an estimated location of the second base station and the estimated location of said each mobile device of the plurality of mobile devices;
combine the plurality of transmission time offsets to determine an adjusted transmission time offset, and
determine an estimated location of a second mobile device based, at least in part, upon a second determined difference between times of arrival at the second mobile device of a third reference signal from the first base station and a fourth reference signal from the second base station and upon the adjusted transmission time offset,
wherein the second mobile device is not any one of the plurality of mobile devices.

10. The location server of claim 9, wherein the one or more processors are further configured to:
initiate transmission to said each mobile device of the plurality of mobile devices a request for measurements by the mobile device; and
initiate transmission to said each mobile device of the plurality of mobile devices positioning assistance data descriptive of aspects of at least the first and the second base stations.

11. The location server of claim 10, wherein said positioning assistance data comprises the estimated locations of the first and the second base stations.

12. The location server of claim 9, wherein the first reference signal comprises one of a first positioning reference signal or a first carrier reference signal, and wherein the second reference signal comprises one of a second positioning reference signal or a second carrier reference signal.

13. The location server of claim 9 wherein the one or more processors are configured to combine the plurality of transmission time offsets by one or more of computing a mean value of the plurality of transmission time offsets, computing a median value of the plurality of transmission time offsets, computing a center of distribution of the plurality of transmission time offsets, computing a least squares fit of the plurality of transmission time offsets, or computing a weighted combination of the plurality of transmission time offsets where outliers are deweighted.

14. A non-transitory storage medium comprising machine-readable code stored thereon which is executable by a location server configured for communicating with a plurality of mobile devices via a communication network, the code comprising:
  code to obtain from each mobile device of the plurality of mobile devices an estimated location of the mobile device, wherein the estimated location is based, at least in part, upon Satellite Positioning System (SPS) signals received by the mobile device from SPS satellites;
  code to obtain from said each mobile device of the plurality of mobile devices a determined difference between times of arrival of a first reference signal from a first base station and a second reference signal from a second base station based, at least in part, on a measured time of arrival of the first reference signal and a measured time of arrival of the second reference signal, wherein the first and second base stations are part of a Long Term Evolution (LTE) network;
  code to determine a plurality of transmission time offsets by determining, for each of said mobile device of the plurality of mobile devices, a transmission time offset of signals from the first and second base stations based, at least in part, upon a first distance and upon a second distance and upon the determined difference between times of arrival,
    wherein the first distance is a distance between an estimated location of the first base station and the estimated location of said each mobile device of the plurality of mobile devices, and
    wherein the second distance is a distance between an estimated location of the second base station and the estimated location of said each mobile device of the plurality of mobile devices;
  code to combine the plurality of transmission time offsets to determine an adjusted transmission time offset; and
  code to determine an estimated location of a second mobile device based, at least in part, upon a second determined difference between times of arrival at the second mobile device of a third reference signal from the first base station and a fourth reference signal from the second base station and upon the adjusted transmission time offset,
    wherein the second mobile device is not any one of the plurality of mobile devices.

15. The non-transitory storage medium of claim 14, wherein said instructions are further executable to:
  code to initiate transmission to said each mobile device of the plurality of mobile devices a request for measurements by the mobile device; and
  code to initiate transmission to said each mobile device of the plurality of mobile devices positioning assistance data descriptive of aspects of at least the first and the second base stations.

16. The non-transitory storage medium of claim 15, wherein said positioning assistance data comprises the estimated locations of the first and second base stations.

17. The non-transitory storage medium of claim 14, wherein the first reference signal comprises one of a first positioning reference signal or a first carrier reference signal, and wherein the second reference signal comprises one of a second positioning reference signal or a second carrier reference signal.

18. The non-transitory storage medium of claim 14 wherein the code to combine the plurality of transmission time offsets comprises one or more of code to compute a mean value of the plurality of transmission time offsets, code to compute a median value of the plurality of transmission time offsets, code to compute a center of distribution of the plurality of transmission time offsets, code to compute a least squares fit of the plurality of transmission time offsets, or code to compute a weighted combination of the plurality of transmission time offsets where outliers are deweighted.

19. An apparatus at a location server configured for communicating with a plurality of mobile devices via a communication network, the apparatus, comprising:
  means for receiving from each mobile device of the plurality of mobile devices an estimated location of the mobile device, wherein the estimated location is based, at least in part, upon Satellite Positioning System (SPS) signals received by the mobile device from SPS satellites;
  means for receiving from said each mobile device of the plurality of mobile devices a determined difference between times of arrival of a first reference signal from a first base station and a second reference signal from a second base station, wherein the determined difference between times of arrival is as determined by said each mobile device, and wherein the first and second base stations are part of a Long Term Evolution (LTE) network;
  means for determining a plurality of transmission time offsets by determining, for each of said mobile device of the plurality of mobile devices, a transmission time offset of signals from the first and second base stations based, at least in part, upon a first distance and upon a second distance and upon the determined difference between times of arrival,
    wherein the first distance is a distance between an estimated location of the first base station and the estimated location of said each mobile device of the plurality of mobile devices, and
    wherein the second distance is a distance between an estimated location of the second base station and the estimated location of said each mobile device of the plurality of mobile devices;
  means for combining the plurality of transmission time offsets to determine an adjusted transmission time offset; and
  means for determining an estimated location of a second mobile device based, at least in part, upon a second determined difference between times of arrival at the second mobile device of a third reference signal from the first base station and a fourth reference signal from the second base station and upon the adjusted transmission time offset,
    wherein the second mobile device is not any one of the plurality of mobile devices.

20. The apparatus of claim 19, wherein the means for receiving the estimated location of the mobile device and the means for receiving the determined difference between times of arrival include means for initiating the receiving of the estimated location of the mobile device and for initiating the receiving of the determined difference between times of arrival in response to receipt by said each mobile device of a message from the location server requesting the estimated location of said each mobile device and for the determined difference between times of arrival.

21. The apparatus of claim 19, wherein the means for receiving the estimated location of the mobile device and the means for receiving the determined difference between times of arrival include means for initiating the receiving of the estimated location of the mobile device and for initiating the receiving of the determined difference between times of arrival in response to receipt of a user input selection at said each mobile device.

22. The apparatus of claim 19, further comprising:
means for receiving from said each mobile device of the plurality of mobile devices a request for positioning assistance data; and
means for transmitting to said each mobile device of the plurality of mobile devices the positioning assistance data,
  wherein the estimated location of said each mobile device of the plurality of mobile devices is based, at least in part, on the received positioning assistance data.

23. The apparatus of claim 19, further comprising:
means for transmitting to said each mobile device of the plurality of mobile devices a request for measurements by said each mobile device; and
means for transmitting to said each mobile device of the plurality of mobile devices positioning assistance data descriptive of aspects of at least the first and the second base stations.

24. The apparatus of claim 23, wherein said positioning assistance data comprises the estimated location of the first base station and the estimated location of the second base station.

25. The apparatus of claim 19, wherein the first reference signal comprises one of a first positioning reference signal or a first carrier reference signal, and wherein the second reference signal comprises one of a second positioning reference signal or a second carrier reference signal.

26. The apparatus of claim 19 wherein the means for combining the plurality of transmission time offsets comprises one or more of means for computing a mean value of the plurality of transmission time offsets, means for computing a median value of the plurality of transmission time offsets, means for computing a center of distribution of the plurality of transmission time offsets, means for computing a least squares fit of the plurality of transmission time offsets, or means for computing a weighted combination of the plurality of transmission time offsets where outliers are deweighted.

* * * * *